(12) United States Patent
Fujii et al.

(10) Patent No.: US 7,610,452 B1
(45) Date of Patent: Oct. 27, 2009

(54) DATA PROCESSING SYSTEM WHEREIN DATA IS STORED IN A MEMORY AND AN EXTERNAL STORAGE IN PARALLEL

(75) Inventors: Yasuo Fujii, Yokohama (JP); Mitsuhiro Kageyama, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/447,009

(22) Filed: May 22, 1995

Related U.S. Application Data

(63) Continuation of application No. 07/607,657, filed on Oct. 31, 1990, now abandoned.

(30) Foreign Application Priority Data

| Oct. 31, 1989 | (JP) | ..................................... 1-281814 |
| Oct. 31, 1989 | (JP) | ..................................... 1-281819 |
| Jan. 10, 1990 | (JP) | ..................................... 2-2785 |

(51) Int. Cl.
   *G06F 12/02* (2006.01)

(52) U.S. Cl. ........................................ 711/154; 711/171

(58) Field of Classification Search ................. 395/400, 395/425, 481, 493, 495, 486, 427; 364/200 MS, 364/900 MS; 358/443, 444, 460, 468, 472
   See application file for complete search history.

(56) References Cited

U.S. PATENT DOCUMENTS

| 4,463,420 | A | * | 7/1984 | Fletcher ....................... 395/425 |
| 4,513,367 | A | * | 4/1985 | Chan et al. ................... 395/425 |
| 4,603,380 | A | * | 7/1986 | Easton et al. ................ 395/425 |
| 4,701,804 | A | * | 10/1987 | Toyoda et al. ................ 358/280 |
| 4,719,568 | A | * | 1/1988 | Carubba et al. .............. 395/425 |
| 4,835,686 | A | * | 5/1989 | Furuya et al. ................ 395/425 |
| 4,847,809 | A | * | 7/1989 | Suzuki ................... 365/189.04 |
| 4,860,119 | A | * | 8/1989 | Maniwa et al. ............... 358/296 |
| 4,884,264 | A | * | 11/1989 | Servel et al. ................ 370/58.1 |
| 4,900,902 | A | | 2/1990 | Sakakibara .................. 235/375 |
| 4,920,478 | A | * | 4/1990 | Furuya et al. ................ 395/425 |
| 5,010,581 | A | * | 4/1991 | Kanno .......................... 382/56 |
| 5,021,989 | A | * | 6/1991 | Fujisawa et al. ............. 395/275 |
| 5,027,221 | A | * | 6/1991 | Hisatake et al. ............. 358/300 |
| 5,027,421 | A | * | 6/1991 | Kanno .......................... 382/47 |
| 5,046,117 | A | * | 9/1991 | Yamashita .................... 382/47 |
| 5,086,434 | A | | 2/1992 | Abe et al. ........................ 375/7 |
| 5,109,485 | A | * | 4/1992 | Smith, Jr. ..................... 395/200 |
| 5,125,044 | A | * | 6/1992 | Nemoto et al. ................. 382/49 |
| 5,153,746 | A | * | 10/1992 | Satoh .......................... 358/401 |
| 5,223,948 | A | * | 6/1993 | Sakurai et al. ............... 358/404 |
| 5,229,866 | A | * | 7/1993 | Kashiwagi et al. .......... 358/444 |
| 5,237,661 | A | * | 8/1993 | Kawamura et al. .......... 395/250 |
| 5,257,120 | A | * | 10/1993 | Hirota ........................ 358/443 |

\* cited by examiner

*Primary Examiner*—Matt Kim
(74) *Attorney, Agent, or Firm*—Fitzpatrick, Cella, Harper & Scinto

(57) ABSTRACT

A data processing system comprises a memory for temporarily storing data, a storage for storing data and a controller for storing the data into the memory by a predetermined unit at a time and storing the data stored in the memory into the storage by the predetermined unit at a time. The storing of the data into the memory and the storing of the data from the memory into the storage are carried out in parallel.

19 Claims, 20 Drawing Sheets

FIG. 2

| PAGE NO | 0001 |
|---|---|
| MEMORY BLOCK NO | 8000 |
| DISK BLOCK NO | 8000 |
| END OF READING FLAG | 0 |

| BLOCK NO | NEXT BLOCK NO |
|---|---|
| 0000 | FFFF |
| 0001 | FFFF |
| 0002 | FFFF |
| 0003 | FFFF |
| 0004 | FFFF |
| 0005 | FFFF |
| 0006 | FFFF |

3b

| BLOCK NO | NEXT BLOCK NO | 11a |
|---|---|---|
| 0000 | FFFF | |
| 0001 | FFFF | |
| 0002 | FFFF | |
| 0003 | FFFF | |
| 0004 | FFFF | |
| 0005 | FFFF | |
| 0006 | FFFF | |

FIG. 6A

| PAGE NO | 0001 |
|---|---|
| MEMORY BLOCK NO | 0000 |
| DISK BLOCK NO | 8000 |
| END OF READING FLAG | OFF |

| BLOCK NO | NEXT BLOCK NO |
|---|---|
| 0000 | 8000 |
| 0001 | FFFF |
| 0002 | FFFF |
| 0003 | FFFF |
| 0004 | FFFF |
| 0005 | FFFF |
| 0006 | FFFF |

| BLOCK NO | NEXT BLOCK NO |
|---|---|
| 0000 | FFFF |
| 0001 | FFFF |
| 0002 | FFFF |
| 0003 | FFFF |
| 0004 | FFFF |
| 0005 | FFFF |
| 0006 | FFFF |

FIG. 7A

| PAGE NO | 0001 |
|---|---|
| MEMORY BLOCK NO | 0000 |
| DISK BLOCK NO | 8000 |
| END OF READING FLAG | OFF |

| BLOCK NO | NEXT BLOCK NO |
|---|---|
| 0000 | 0001 |
| 0001 | 8000 |
| 0002 | FFFF |
| 0003 | FFFF |
| 0004 | FFFF |
| 0005 | FFFF |
| 0006 | FFFF |

| BLOCK NO | NEXT BLOCK NO |
|---|---|
| 0000 | FFFF |
| 0001 | FFFF |
| 0002 | FFFF |
| 0003 | FFFF |
| 0004 | FFFF |
| 0005 | FFFF |
| 0006 | FFFF |

| PAGE NO | 0001 |
|---|---|
| MEMORY BLOCK NO | 0000 |
| DISK BLOCK NO | 0000 |
| END OF READING FLAG | OFF |

| BLOCK NO | NEXT BLOCK NO |
|---|---|
| 0000 | 0001 |
| 0001 | 8000 |
| 0002 | FFFF |
| 0003 | FFFF |
| 0004 | FFFF |
| 0005 | FFFF |
| 0006 | FFFF |

| BLOCK NO | NEXT BLOCK NO |
|---|---|
| 0000 | 8000 |
| 0001 | FFFF |
| 0002 | FFFF |
| 0003 | FFFF |
| 0004 | FFFF |
| 0005 | FFFF |
| 0006 | FFFF |

| PAGE NO | 0001 |
|---|---|
| MEMORY BLOCK NO | 0001 |
| DISK BLOCK NO | 0000 |
| END OF READING FLAG | OFF |

FIG. 9B

| BLOCK NO | NEXT BLOCK NO |
|---|---|
| 0000 | FFFF |
| 0001 | 0002 |
| 0002 | 0003 |
| 0003 | 8000 |
| 0004 | FFFF |
| 0005 | FFFF |
| 0006 | FFFF |

FIG. 9C

| BLOCK NO | NEXT BLOCK NO |
|---|---|
| 0000 | 0001 |
| 0001 | 8000 |
| 0002 | FFFF |
| 0003 | FFFF |
| 0004 | FFFF |
| 0005 | FFFF |
| 0006 | FFFF |

FIG. 10A

| PAGE NO | 0001 |
|---|---|
| MEMORY BLOCK NO | 0002 |
| DISK BLOCK NO | 0000 |
| END OF READING FLAG | OFF |

| BLOCK NO | NEXT BLOCK NO |
|---|---|
| 0000 | 8000 |
| 0001 | FFFF |
| 0002 | 0003 |
| 0003 | 0000 |
| 0004 | FFFF |
| 0005 | FFFF |
| 0006 | FFFF |

| BLOCK NO | NEXT BLOCK NO |
|---|---|
| 0000 | 0001 |
| 0001 | 0002 |
| 0002 | 8000 |
| 0003 | FFFF |
| 0004 | FFFF |
| 0005 | FFFF |
| 0006 | FFFF |

| PAGE NO | 0001 |
|---|---|
| MEMORY BLOCK NO | 0003 |
| DISK BLOCK NO | 0000 |
| END OF READING FLAG | ON |

| BLOCK NO | NEXT BLOCK NO |
|---|---|
| 0000 | 8000 |
| 0001 | FFFF |
| 0002 | FFFF |
| 0003 | 0000 |
| 0004 | FFFF |
| 0005 | FFFF |
| 0006 | FFFF |

| BLOCK NO | NEXT BLOCK NO |
|---|---|
| 0000 | 0001 |
| 0001 | 0002 |
| 0002 | 0003 |
| 0003 | 8000 |
| 0004 | FFFF |
| 0005 | FFFF |
| 0006 | FFFF |

| PAGE NO | 0001 |
|---|---|
| MEMORY BLOCK NO | 0000 |
| DISK BLOCK NO | 0000 |
| END OF READING FLAG | ON |

| BLOCK NO | NEXT BLOCK NO |
|---|---|
| 0000 | 8000 |
| 0001 | FFFF |
| 0002 | FFFF |
| 0003 | FFFF |
| 0004 | FFFF |
| 0005 | FFFF |
| 0006 | FFFF |

| BLOCK NO | NEXT BLOCK NO |
|---|---|
| 0000 | 0001 |
| 0001 | 0002 |
| 0002 | 0003 |
| 0003 | 0004 |
| 0004 | 8000 |
| 0005 | FFFF |
| 0006 | FFFF |

| PAGE NO | 0001 |
|---|---|
| MEMORY BLOCK NO | 8000 |
| DISK BLOCK NO | 0000 |
| END OF READING FLAG | ON |

| BLOCK NO | NEXT BLOCK NO |
|---|---|
| 0000 | FFFF |
| 0001 | FFFF |
| 0002 | FFFF |
| 0003 | FFFF |
| 0004 | FFFF |
| 0005 | FFFF |
| 0006 | FFFF |

| BLOCK NO | NEXT BLOCK NO |
|---|---|
| 0000 | 0001 |
| 0001 | 0002 |
| 0002 | 0003 |
| 0003 | 0004 |
| 0004 | 0005 |
| 0005 | 8000 |
| 0006 | FFFF |

| BLOCK NUMBER | TABLE | | | |
|---|---|---|---|---|
| 0000 | 0 | 0 | 0 | 1 |
| 0001 | 0 | 0 | 0 | 4 |
| 0002 | F | F | F | F |
| 0003 | F | F | F | F |
| 0004 | 8 | 0 | 0 | 0 |
| ⋮ | ⋮ | | | |
| 0511 | F | F | F | F |

FIG. 16

| BLOCK NUMBER | TABLE | | | |
|---|---|---|---|---|
| 0000 | 0 | 0 | 0 | 1 |
| 0001 | 0 | 0 | 0 | 2 |
| 0002 | 8 | 0 | 0 | 0 |
| 0003 | F | F | F | F |
| 0004 | F | F | F | F |
| ⋮ | ⋮ | | | |
| 1023 | F | F | F | F |

DATA PROCESSING SYSTEM WHEREIN DATA IS STORED IN A MEMORY AND AN EXTERNAL STORAGE IN PARALLEL

This application is a continuation-in-part of application Ser. No. 07/607,657 filed Oct. 31, 1990 now abandoned.

BACKGROUND OF THE INVENTION

1. Field of the Invention

The present invention relates to a data processing system having a storage for storing data.

2. Related Background Art

A facsimile system having a hard disk drive has been known as one system of this kind. Applications relating to such a facsimile system are U.S. Pat. Nos. 4,829,467, 4,827,349, 4,910,785, and 4,829,385 and U.S. patent application Ser. Nos. 06/911,779 (filed on Sep. 26, 1986), 07/267,732 (Continuation filed on Nov. 3, 1988), 06/942,208 (filed on Dec. 16, 1986) and 07/269,733 (filed on Nov. 10, 1988).

In those facsimile systems, when data is to be stored in a hard disk drive, data is temporarily stored in a semiconductor memory. After the data has been stored in the memory, it is stored into the hard disk from the memory. To this end, a semiconductor memory having a large memory capacity is required. Further, since the data is stored in the hard disk after it has been stored in the memory, a time required to store the data into the hard disk is long.

SUMMARY OF THE INVENTION

It is an object of the present invention to improve a data processing system to solve the above problems.

It is another object of the present invention to shorten a time required to store data into a storage.

It is another object of the present invention to provide a data processing system which efficiently stores data into the storage.

It is another object of the present invention to provide a data processing system which requires a small capacity of memory for temporarily storing data in order to store the data into the storage.

It is another object of the present invention to provide a data processing system in which data to be stored in the storage is divided into a plurality of blocks and stored into the storage block by block.

It is another object of the present invention to provide a data processing system which temporarily stores data in the memory and then stores the data into the storage from the memory and parallelly performs the storing of the data into the memory and the storing of the data into the storage.

It is another object of the present invention to provide a data processing system which temporarily stores data in the memory and then stores the data into the storage from the memory and records the data stored in the storage, and which alters a record output in accordance with a remaining capacity of the storage.

Other objects of the present invention will be apparent from the following detailed description of the embodiments.

BRIEF DESCRIPTION OF THE DRAWINGS

FIG. 2 shows an initial state of a page management table in the first embodiment, FIG. 3 shows an initial state of a memory management table in the first embodiment, FIGS. 6A to 6C through 13A to 13C show shifts of tables in respective steps of the process in the first embodiment, FIG. 15 shows an image memory buffer management table in the second embodiment, FIG. 16 shows a storage management table in the second embodiment.

DETAILED DESCRIPTION OF THE PREFERRED EMBODIMENTS

Embodiments of the present invention are now explained with reference to the accompanying drawings. In the following embodiment, a data processing system is a facsimile system which stores image data read or received, into a hard disk.

Figure 1:
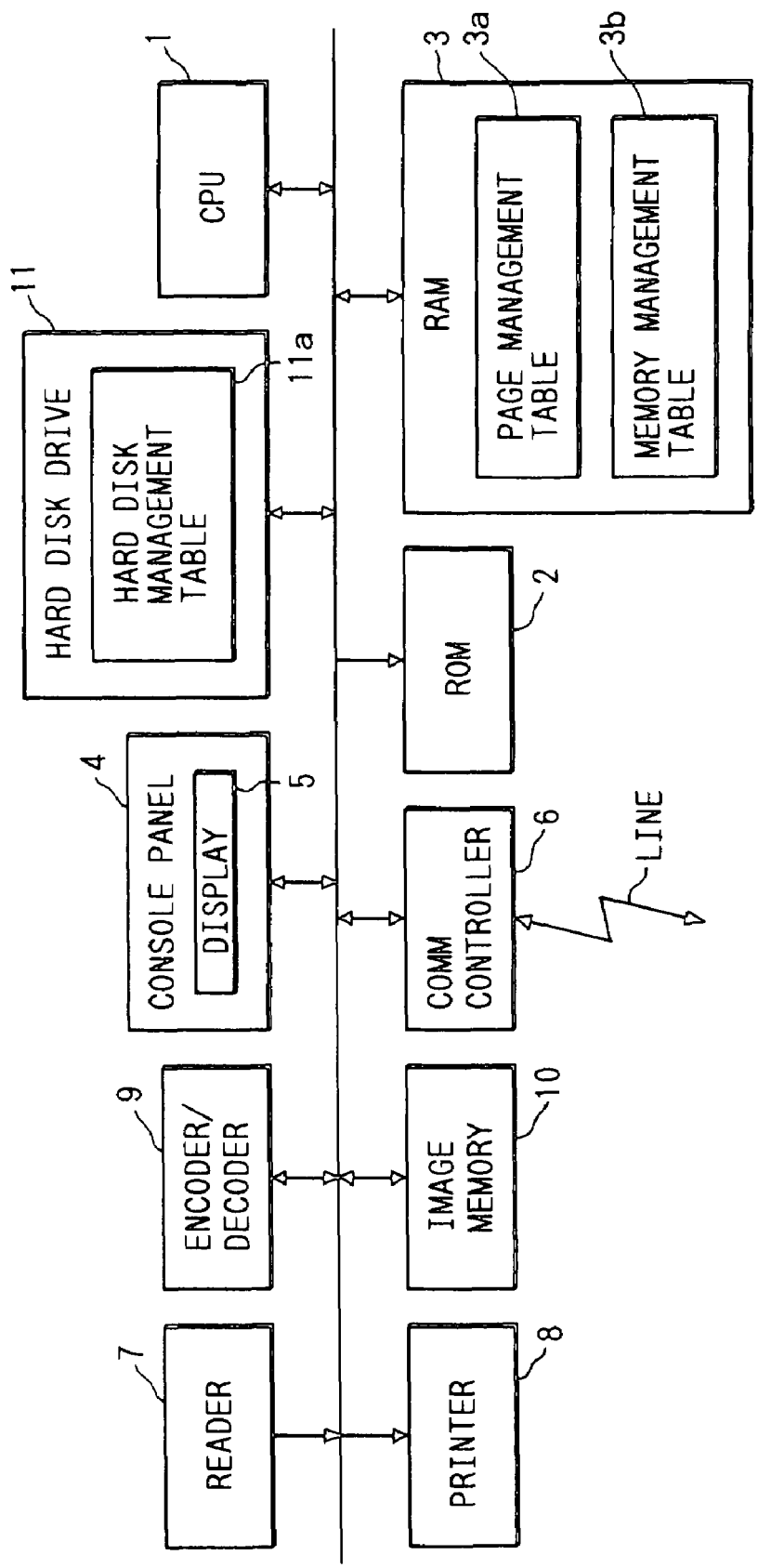
FIG. 1 shows a block diagram of a facsimile system in accordance with a first embodiment.

FIG. 1 shows a block diagram of a facsimile system in accordance with a first embodiment of the present invention.

Numeral 1 denotes a CPU which controls the overall system. Numeral 2 denotes a ROM which stores a program relating to a communication process of the CPU 1 as well as programs relating to flow charts shown in FIGS. 5A and 5B to be explained later. Numeral 3 denotes a RAM which is used as a work area for the CPU 1 and has a page management table 3a and a memory management table 3b to be explained later. Numeral 4 denotes a console panel having a group of keys for various operations and a display (e.g. liquid crystal display) 5 for displaying messages. Numeral 6 denotes a communication controller for controlling the connection between the system and a line. Data is transmitted and received through the communication controller 6. Numeral 7 denotes a reader for reading a document image, and numeral 8 denotes a printer for visually recording the received image. Numeral 9 denotes an encoder/decoder for encoding the image data read from the reader 7 and for decoding the data received through the communication controller 6. Numeral 10 denotes an image memory for storing the received data or the data read by the reader 7. Numeral 11 denotes a hard disk drive which has a larger capacity than the image memory 10 and has an area for storing a hard disk management table 11a to be explained later.

In the above configuration, an operation of transmission reservation is briefly explained.

The image memory 10 in the present embodiment is divided into a plurality of blocks and managed block by block. In order to simplify the explanation, it is assumed in the present embodiment that one block comprises 4k bytes and the memory comprises seven blocks (block No. 0000~0006).

The storing in the hard disk drive 11 is also done block by block and each block comprises 4k bytes.

FIG. 2 shows an initial state of the page management table 3a in the present embodiment.

"0001" in a column. "Page No." indicates the page of document to be read by the reader 7, and a column "Memory Block No." includes a block number in the image memory of the read image which is to be first stored into the hard disk drive 11. A column "Disk Block No." includes a block number of the hard disk drive 11 in which the data is to be stored (retained). A column "End of Reading Flag" includes data which is ON when the reading of a page of image under consideration is over and the storing into the image memory 10 is over, and OFF otherwise.

FIG. 3 shows an initial status of the memory management table 3b in the present embodiment.

As explained before, seven memory blocks, that is, block Nos. 0000~0006 are managed. A column "Next Block No." includes a block No. to be stored next to the storing of the read data into the area specified by the present memory block No. Thus, even if the data is stored over a plurality of blocks, a manner of connection of the blocks is indicated. Where "FFFF" (in hexadecimal) is written in the column "Next Block No.", it indicates that the memory block under consideration is vacant. If it is "8000", it indicates that the memory block under consideration is the last one or the memory block in which the image data is being written.

Figures 4, 5A:
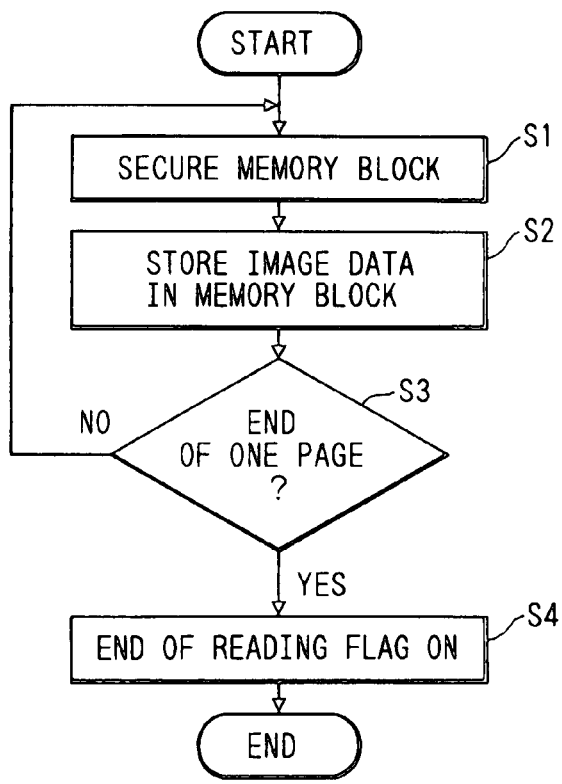
FIG. 4 shows an initial state of a hard disk management table in the first embodiment.
FIGS. 5A and 5B show flow charts of an operation process of a CPU in the first embodiment.

FIG. 4 shows an initial state of a hard disk management table 11a of the present embodiment.

A minimum unit of the disk block to be managed by the hard disk management table 11a is the same as that of the memory block explained before. A column "Next Block No." includes a block number next to the disk block under consideration. Where it is "FFFF" or "8000", it means the same as that of the memory management table 3b.

In the above configuration, an operation of the present embodiment is explained with reference to the tables and FIGS. 6 to 13.

When a start of document reading command is received, the memory management table 3b is referred before the reader 7 is driven, to search (secure) a vacant block. For example, the column "Next Block No." of the memory management table 3b is searched to find out the memory block having "FFFF". If there are more than one such memory block, the one having a smallest block number is selected. One vacant block is secured by the search, but since no data has been written into that memory block, "8000" is written in the corresponding column "Next Block No." to indicate that the memory block is the last one.

Then, in order to store a relationship between the secured block number and the page of the document to be read, "1" is written in the column "Page No." of the page management table 3a to indicate that it is the top page, and the secured memory block number is written into the column "Memory Block No.". The status of the table in this stage is shown in FIGS. 6A-6C.

Then, the document image is actually read by the reader 7. The read data is sequentially stored into the secured memory block having the block No. "0000".

After the data has been stored in the memory block under consideration, the memory management table 3b is referred to secure the memory block in which the data is to be next stored, in order to secure a new vacant memory block. In order to indicate the connectivity with the memory block in which the data has been stored previously, the newly secured memory block number is written in the column "Next Block No." of the memory block in which the data has been stored previously, and "8000" is written in the column "Next Block No." of the new memory block. The status of the table in this stage is shown in FIGS. 7A-7C. Thereafter, the data is written into the secured memory block, and if the memory block becomes full, a new memory block is secured, and these steps are repeated. When one page of image data has been stored in the memory block, the column "End of Reading Flag" of the page management table 3a corresponding to the page under consideration is turned off.

In this manner, the read image is stored into the image memory 10. In the present embodiment, the CPU 1 stores the data stored in the memory block into the hard disk drive 11 in a separate task. This process is now explained.

The task stands by while the column "Memory Block No." of the page management table 3a includes the end code, that is, "8000", and executes the following process when it is another code. Briefly, it waits for the start of the reading of the image and the start of the storing of the read image into the memory block.

It waits until the column "Next Block No." of the memory management table 3a no longer includes the end code ("8000") or the end of reading flag of the page management table is turned on. In other words, it waits until the memory block in which the data has heretofore been stored becomes full and a new memory block is assigned, or the reading of the page under consideration of the draft is completed in the course of the storing of the data into the memory block under consideration. When such a state is detected, it means that the data stored so far in the memory block may be retained (stored) into the hard disk drive 11. Thus, the CPU 1 searches a vacant block of the hard disk management table 11a and writes "8000" in the column "Next Block No." of the searched vacant block to secure that block. If the column "Disk Block No." of the page management table 3a includes the end code, the disk block No. which has been newly secured is written, and if it is other than the end code, the disk block No. which has been newly secured is written into the column "Next Block No." of the previously used hard disk management table 11a. Then, the data in the image memory designated by the "Memory Block No." of the page management table 3a is stored into the secured disk block. An example of tables under this state is shown in FIGS. 8A-8C. Briefly, they show that the read image data is being stored into the memory block "0001", and the disk block "0000" of the hard disk drive 11 contains the content of the memory block "0000" so far stored.

When one block of data has been stored into the hard disk drive 11, the column "Memory Block No." of the page management table 3a is updated by the column "Next Block No." of the memory management table 3b designated by that memory block No. Further, "FFFF" is written into the column "Next Block No." of the memory management table 3b of the memory block which has been stored into the hard disk drive 11, to make it a vacant block.

Referring to FIG. 8, since the column "Memory Block No." of the page management table 3a is "0000", the column "Next Block No." of the block No. "0000" of the memory management table is checked. Since it is "0001", the column "Memory Block No." of the page management table 3a is updated to "0001".

A status of the tables at this stage is shown in FIG. 9.

It shows that the read image data is being stored into the memory block "0003", and the memory block "0000" has been stored in the hard disk drive 11 and the disk block "0001" has been secured in order to store the content of the memory block "0001" into the hard disk drive 11.

In FIG. 9, the memory block which is next secured after the memory block "0003" in which the data is being stored becomes full is "0000". Accordingly, after the status of FIG. 9, the status changes as shown in FIG. 10.

By repeating the above process, the reading of the document image under consideration is eventually completed. Thus, in the read and memory storing task, the column "End of Reading Flag" of the page management table 3a is turned on.

A status at this stage is shown in FIG. 11. It shows that the last portion of the document image under consideration has been stored in the memory block "0000", and the data in the memory block "0003" which stores the previous portion is being stored into the disk block "0003" of the hard disk drive 11.

Then, the tables change as shown in FIGS. 12A-12C and finally to FIGS. 13A-13C in which the column "Next Block No." of the memory management table 3b all include "FFFF". The second page of the document image is also processed in a similar manner, and the storing of the data into the hard disk drive 11 is started from the disk block "0006".

The above process is executed by the CPU 1. The operation process thereof is explained with reference to flow charts of FIGS. 5A and 5B.

A task for reading the document image and storing it into the image memory is first explained with reference to the flow chart of FIG. 5A.

When a read document-command is received (through a key on the console panel), a memory block in which the read image is to be stored is secured (step S1). In a step S2, the input image data is sequentially stored into the secured memory block. In a step S3, the steps S1-S3 are repeated until it is determined that one page of document image under consideration has been stored. When it is determined that one page of document image has been read and stored into the memory, the end of reading flag of the page management table 3a is turned on.

Figure 5B:
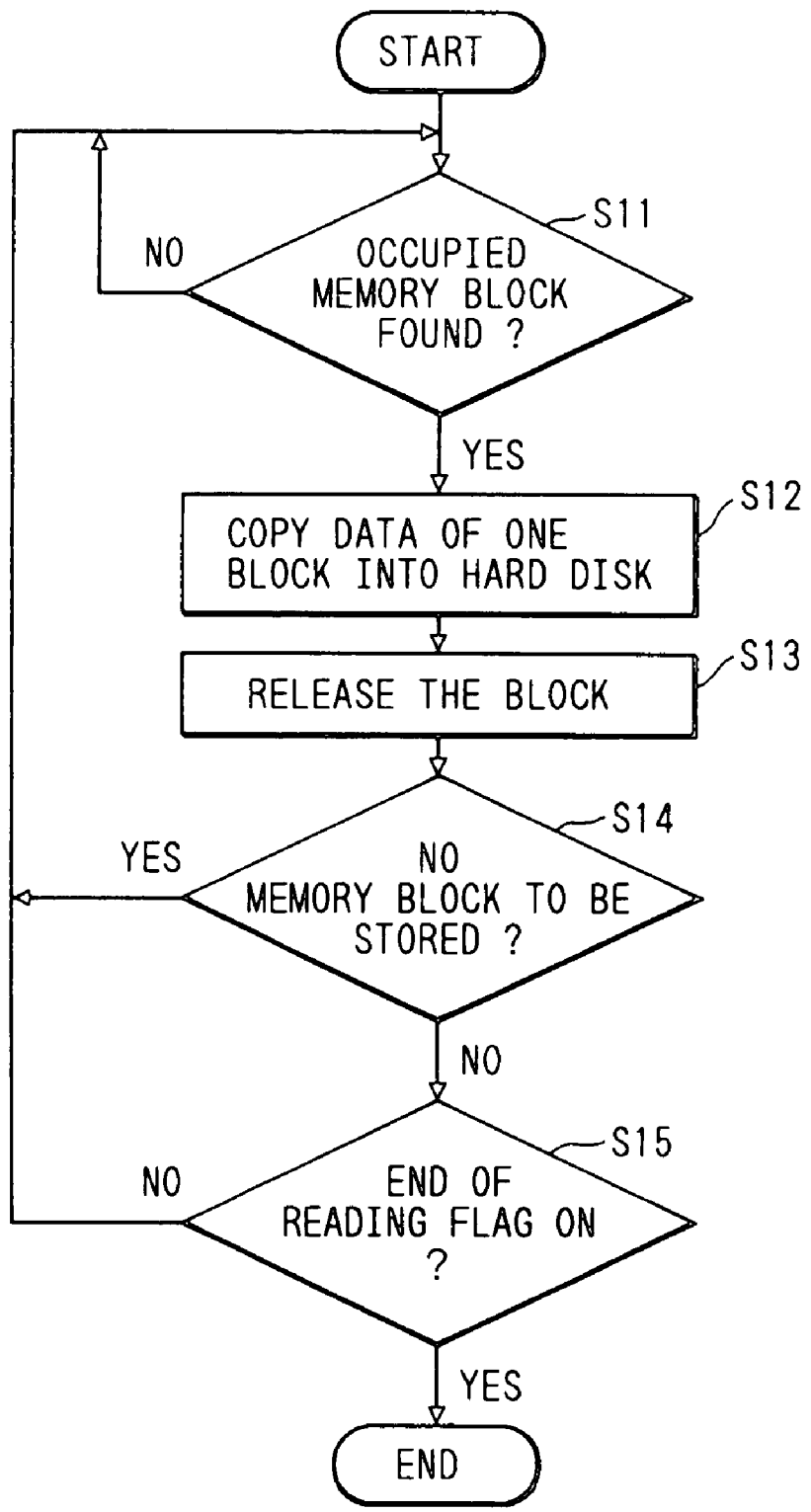

A task for storing the data from the image memory to the hard disk drive 11, which is executed in parallel with the above task, is explained with reference to the flow chart of FIG. 5B.

In a step S11, whether there is an occupied memory block or not is determined, and if there is not, the step stands by until it is found. When the occupied memory block is detected, the data in that memory block is copied (stored) into the hard disk drive 11 (step S12). When the copying is completed, the memory block may again be a candidate for storing the data. Thus, in a step S13, that memory block is released. (The next block No. is changed to "FFFF"). In a step S14, whether there is a memory block to be stored or not is determined, and if there is, the process returns to the step S11. If there is no memory block to be stored, the process proceeds to a step S15 to determine whether the end of reading flag which indicates the end of the storing is ON or not. If it is OFF, the process returns to the step S11.

In accordance with the present embodiment, it is possible to render the size of the image memory 10 much smaller than the code size of the image to be transmitted. The image memory 10 may be used as a buffer for the read data so that the feeling of operation which is similar to that of a conventional memory is attained even if a secondary storage such as a hard disk drive having a lower transfer speed than the memory is used.

In the embodiment, the data read by the reader 7 is stored in the memory blocks of the image memory 10, and when one of the memory blocks becomes full, the content thereof is stored into the hard disk drive 11. However, the data to be stored is not limited to the image data inputted by the reader 7. For example, the data read by the reader 7 may be encoded by the encoder/decoder 9 and the encoded data may be stored in the image memory 10.

In accordance with the first embodiment, the memory for storing the read image may be of small capacity and a time required for transmission reservation is shortened.

Second Embodiment

Figure 14:
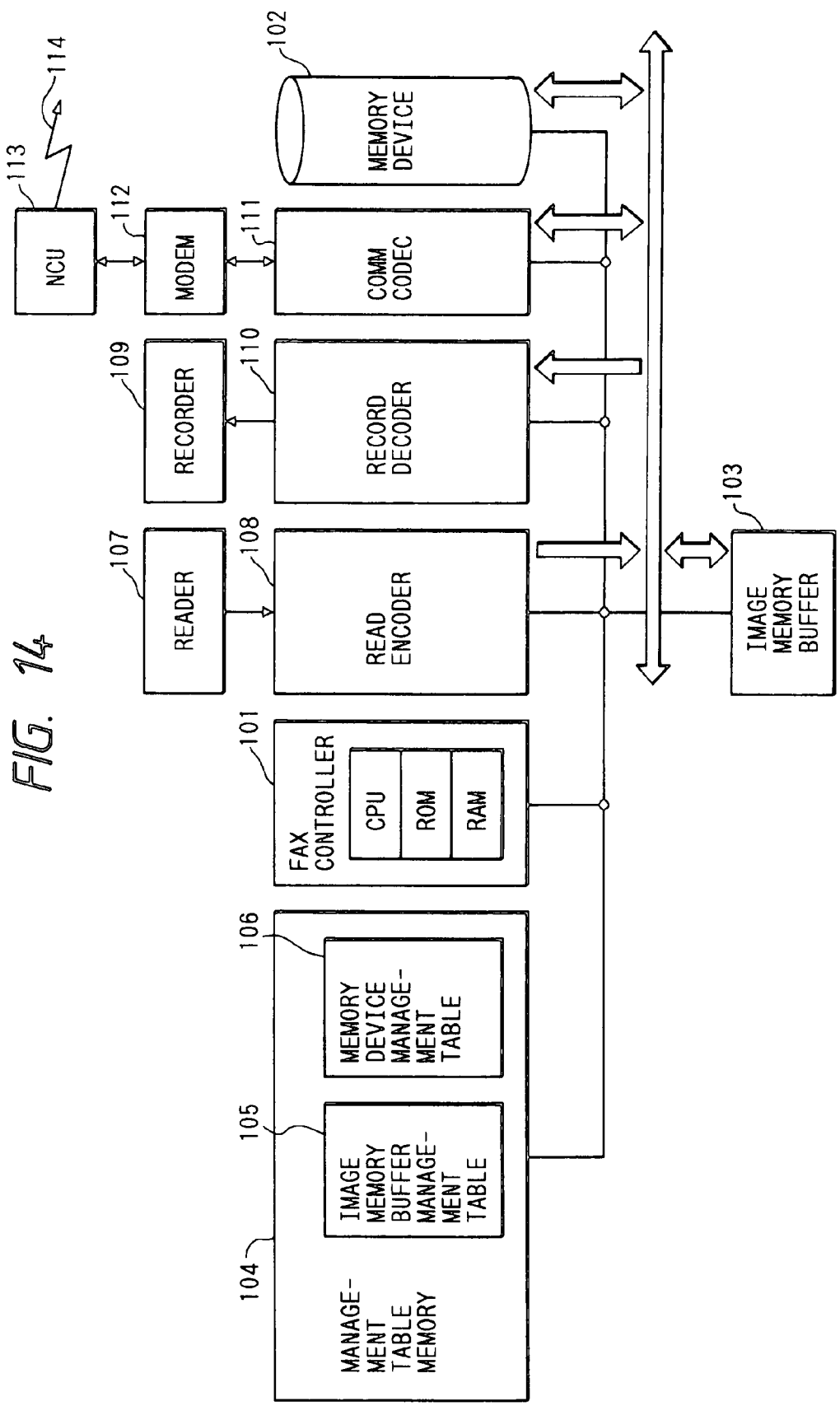
FIG. 14 shows a block diagram of a facsimile system in accordance with a second embodiment.

FIG. 14 shows a block diagram of a facsimile system in accordance with a second embodiment.

A FAX controller 101 controls an overall system and comprises a CPU, a ROM and a RAM. For example, it controls block units to be described below. The ROM stores programs relating to flow charts shown in FIGS. 17 to 20 to be explained later.

A storage 102 stores information by a relative movement between a recording medium and a transducer, such as a floppy disk or a hard disk drive. (The present embodiment uses the latter.)

An image memory buffer 103 temporarily stores an internal compressed encoded data (such as MR code) to be transferred from a reading encoder 108 and a communication codec 111 to the storage 102 or from the storage 102 to a recording decoder 110 and the communication codec 111. The storage 102 is divided into disk blocks having a predetermined storage capacity (for example, 8k bytes) and managed block by block. The image memory buffer 103 is also divided into memory blocks and the internal compressed encoded data is transferred block by block. The transfer is done by DMA transfer which enables the high speed and large capacity data transfer.

An image memory buffer management table 105 and a storage management table 106 are provided in a management table memory 104 to manage the image memory buffer 103 and the storage 102. FIG. 15 shows a content of the image memory buffer management table 106, and FIG. 16 shows a content of the storage management table 106. In each block number of the management table, the memory block number (or the disk block number for the storage management table 106) following that block is stored. The blocks are chained in this manner to form a file. When the block under consideration is vacant or the last block, a block number which does not actually exist is stored. In the present embodiment, 512 memory blocks are secured in the image memory buffer 103, and 1024 disk blocks are secured. If the memory block under consideration is vacant, "FFFF" is stored and if it is the last memory block, "8000" is stored to distinguish them. The same rule applies to the storage management table 106. At the initial state, all columns of the management tables include "FFFF".

A read encoder 108 encodes the image information read by the reader 107 into the internal compressed encoded data and supplies it to the image memory buffer 103.

A record decoder 111 decodes the internal compressed encoded data supplied from the image memory buffer 103 into the image information, which is printed by a recorder 109.

A communication codec 111 converts the internal compressed encoded data supplied from the image memory buffer 103 into compressed coded data to be transmitted to a destination facsimile system. The converted data is sent out to a line 114 through a modem 112 and an NCU 113. It also converts the compressed encoded data received from the destination facsimile system through the line 114, the NCU 113 and the modem 112 into the internal compressed encoded data and supplies it to the image memory buffer 103.

An operation of the system configured as described above is now briefly explained.

The present system operates in the combination of memory storing, memory reception, memory print and memory transmission. The operations thereof are explained with reference to the flow charts of FIGS. 17 to 20.

<Memory Storing>

The memory storing is explained by two parts, that is, an operation to convert the image information read by the reader 107 to the internal compressed encoded data and transfer it from the read encoder 108 to the image memory buffer 103, and a subsequent operation.

Figure 17:
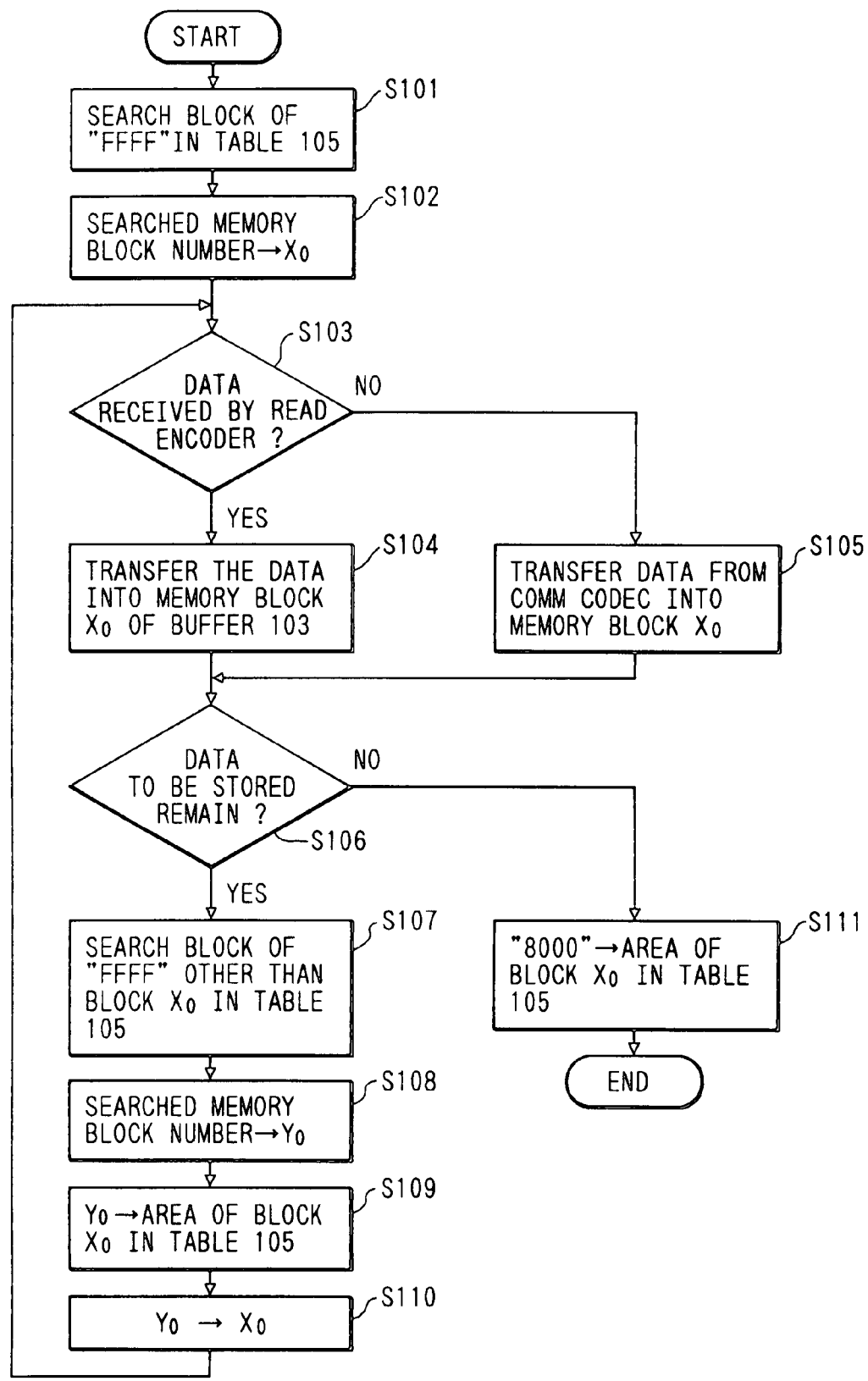
FIG. 17 shows a flow chart of a transfer process of document image or received image to a memory.

First, the operation to transfer the compressed encoded data into the image memory buffer 103 is explained with reference to the flow chart of FIG. 17. In the following description, it is assumed that variables $x_0$-$x_3$, $y_0$-$y_3$, $A_0$, $A_1$ and $B_0$, $B_1$ are stored in the vacant area of the management table memory 104.

First, in order to find a vacant block of the image memory buffer 103, a memory block having "FFFF" in the image memory buffer management table 105 is searched (step S101). The first data of the read document will be stored in the memory block designated by the management table. "FFFF" has been written in the table of the vacant memory block.

In a step S102, the searched memory block number is set to a variable $x_0$. Then, in a step S103, whether the data to be transferred (stored) is from the reader 107 or received externally is determined.

If it is the data from the reader 107, the data from the read encoder 108 is transferred to the memory block in the image memory buffer 103 designated by the block number stored at the variable $x_0$ (step S104).

Then, whether there is data to be next stored or not is determined (step S106). If there is no image information to be read by the reader 107, the process proceeds to a step S111 to write "8000" in the memory block of the image memory buffer management table designated by the variable $x_0$, and the process is then terminated.

On the other hand, if there is data to be next stored, a vacant block other than the memory block designated by the variable $x_0$ is searched (step S107), and the searched block number is written into a variable $y_0$ (step S108). The memory block designated by the block number written at the variable $y_0$ is the subject of next storage. In order to make clear the connectivity with the memory block in which the data has so far been stored, the block number written at the variable $y_0$ is written into the column of the image memory buffer management table 105 designated by the variable $x_0$ (step S109). Then, the variable $x_0$ is substituted by the variable $y_0$ to define the memory block for the next storage (step S110), and the process returns to the step S103.

In this manner, the image memory buffer management table 105 as shown in FIG. 15 is attained. In the present embodiment, since "0001" has been written in the column of the memory block "0000", it is seen that the memory block "0001" follows to the memory block "0000". Similarly, it is seen that the memory block "0004" follows to the memory block "0001" and the memory block "0004" is the last one.

Figure 18:
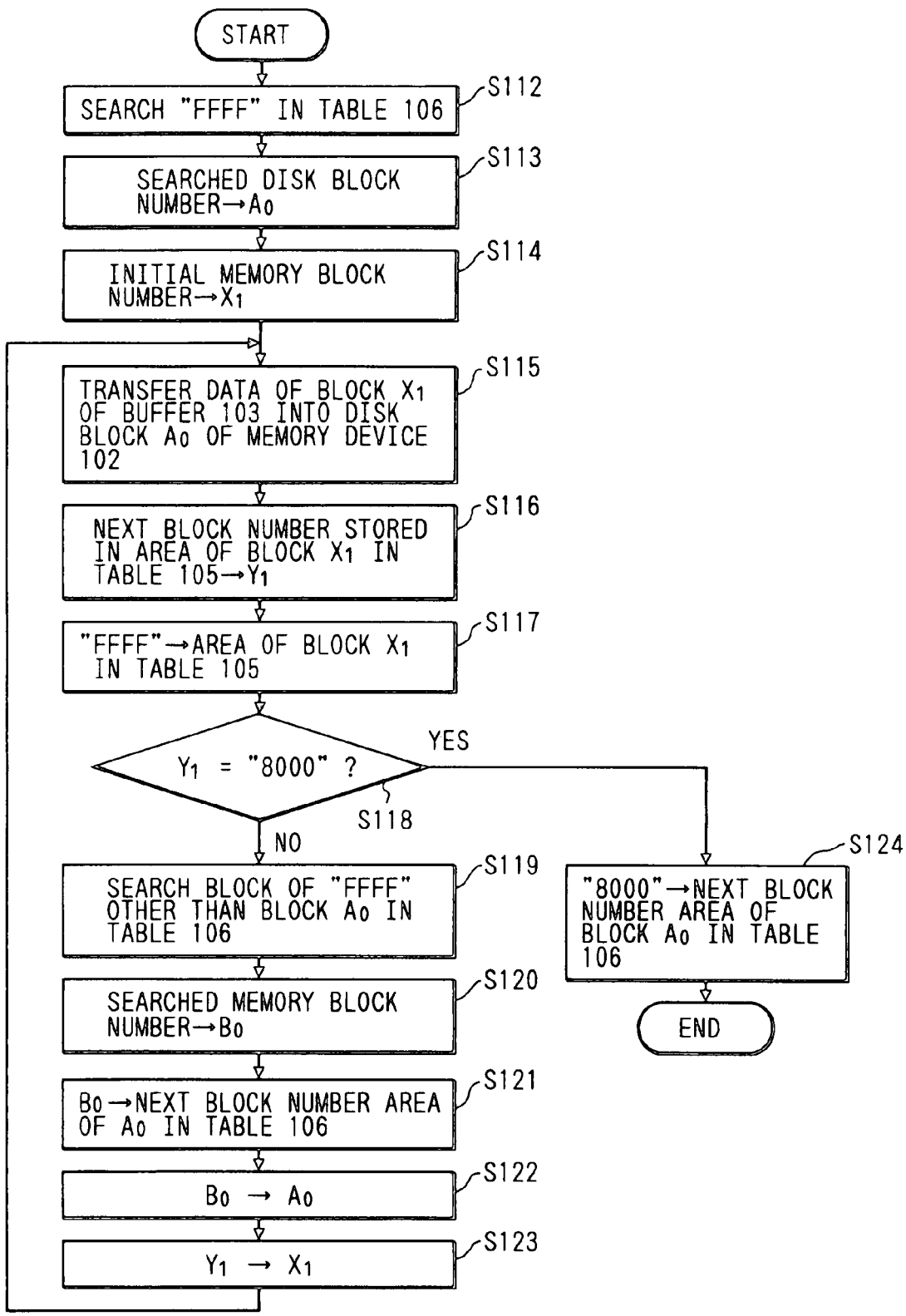
FIG. 18 shows a flow chart of a data transfer process from the memory to a storage.
Figure 19:
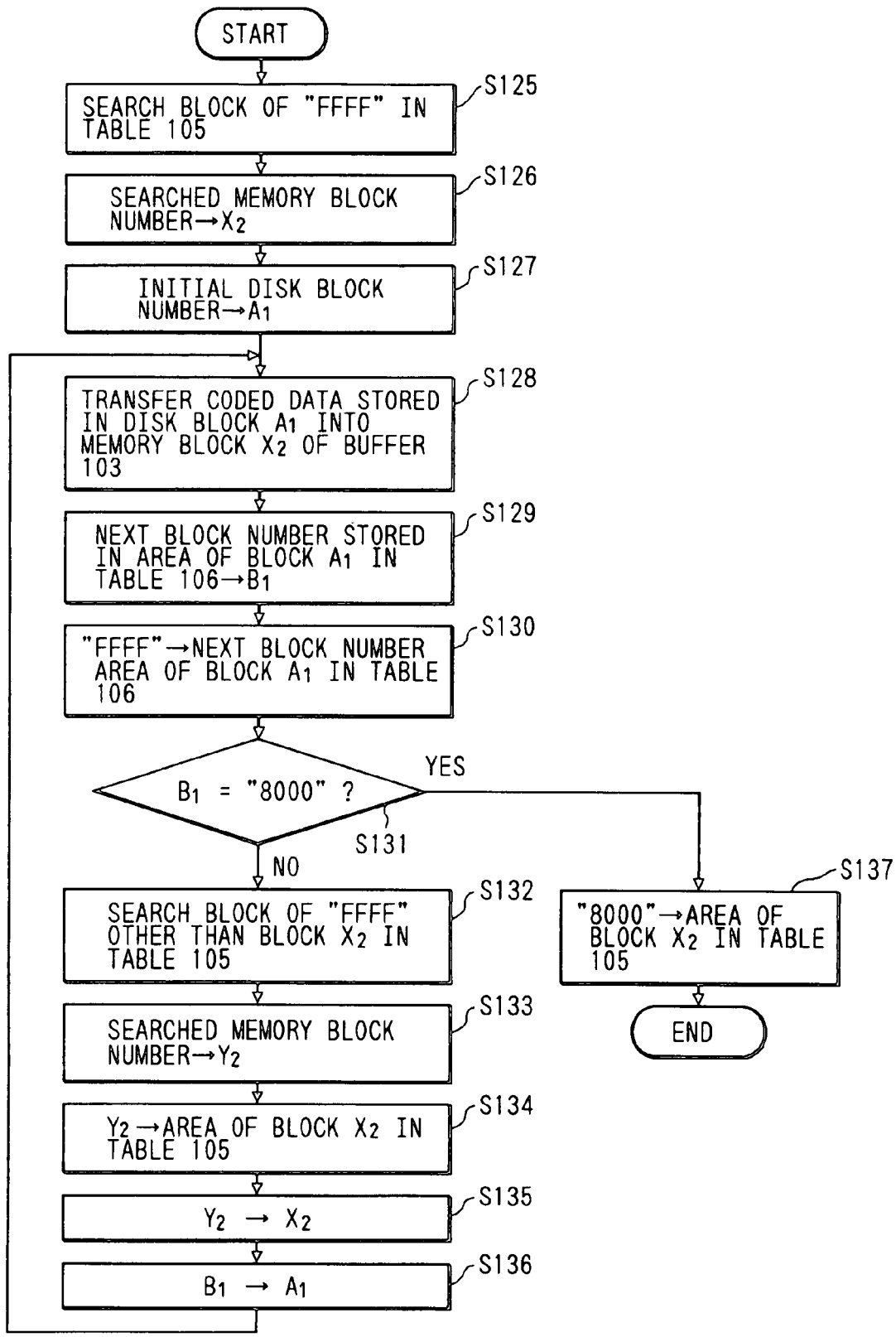
FIG. 19 shows a flow chart of a data transfer process from the storage to the memory.

An operation to transfer the compressed data from the image memory buffer 103 to the storage 102 is now explained with reference to a flow chart of FIG. 18. This process is carried out in parallel to the process of the flow chart of FIG. 17. It is carried out when it is determined that the data to be transferred is stored.

First, a transfer-to block in the storage 102 is searched. Specifically, a disk block having "FFFF" in the storage management table 106 is searched (step S112). The searched disk block number is stored at a variable $A_0$ (step S113). Thereafter, the image memory buffer management table 105 is referred to search the top memory block and it is stored at a variable $x_1$ (step S114). In a step S115, the data in the memory block designated by the variable $x_1$ in the image memory buffer 103 is DMA transferred to the disk block of the storage 102 designated by the variable $A_0$. Then, the next block number stored in the memory block column of the image memory buffer management table 105 designated by the variable $x_1$ is stored at a variable $y_1$ (step S116), "FFFF" is written into the transferred memory block column designated by the variable $x_1$ to release it as a vacant memory block to the image data storing process (flow chart of FIG. 17) (step S117).

Then, the process proceeds to a step S118 to determine whether the next block number of the memory block to be next transferred is "8000" or not. If it is "8000", it means that the transfer process is over and the process proceeds to a step S124 to write "8000" into the next block number of the corresponding disk block of the storage management table 106 designated by the variable $A_0$.

On the other hand, if the next block number of the memory block designated by the variable $y_1$ is other than "8000", it means that there is data to be next transferred and a vacant disk block is searched from the storage management table 106 (step S119). The searched vacant disk block number is written at a variable $B_0$ (step S120). Then, in order to indicate that the newly searched disk block connects and follows to the disk block in which the data has been previously stored, the content stored at the variable $B_0$ is written into the next block number column of the disk block designated by the variable $A_0$ (step S121). In steps S122 and S123, the variable $A_0$ is updated by the variable $B_0$, and the variable $x_1$ is updated by the variable $y_1$. Then, the steps S115 et seq are repeated.

In this manner, the storage management table 106 is changed as shown in FIG. 16. Thus, the data read in the memory transmission mode can be stored in the storage 102.

<Memory Reception>

In the above example, the document image to be transmitted is read by the reader 107 and it is stored in the storage 102 through the image memory buffer 103 (memory storing in the memory transmission mode). The operation is same in the memory reception mode. In the memory reception mode, the compressed encoded data received from a sending facsimile system through the line 114, the NCU 113 and the modem 112 is converted to the internal encoded data by the communication codec 111 and it is stored in the image memory buffer 103. Only change is a receiving unit which has been changed from the read encoder 108 to the communication codec 111. This change is attained by adding a step 103 of a flow chart of FIG. 17 to determine whether the input data is the read data or not and a step S105 which is a process carried out when the input data is other than the read data. Thus, the memory storing in the memory reception mode is duplicate of the process described above and the detail thereof is omitted here.

The internal encoded data of the received data stored in the image memory buffer 103 is stored in the storage 102. This process may be carried out in accordance with a flow chart of FIG. 18 and the explanation thereof is omitted.

<Memory Print>

A process for transferring the internal compressed encoded data stored in the storage 102 to the image memory buffer 103 and thence to the record decoder 110, converting it to the image information and printing it by the recorder 109 is now explained.

This process is divided into a process for transferring the compressed encoded data from the storage 102 to the image memory buffer 103 and a subsequent process. The former process for transferring the compressed encoded data to the image memory buffer 103 is first explained with reference to a flow chart of FIG. 19.

First, "FFFF" in the image memory buffer management table 105 is searched to find a vacant memory block (step S125) and the memory block number is stored at a variable $x_2$ (step S126). By referring the storage management table 106, the top disk block of the data stored in the storage 102 is searched and that disk block number is stored at the variable $A_1$ (step S127).

Then, the internal encoded data in the disk block designated by the variable $A_1$ is transferred to the memory block of the image memory buffer 103 designated by the variable $x_2$ (step S128). The content of the next block column of the storage management table 106 designated by the variable $A_1$ is written at the variable $B_1$ (step S129). In order to release the disk block designated by the variable $A_1$ for the process shown in FIG. 18, "FFFF" is written into the next block column of the corresponding position of the storage management table 106 (step S130). Then, whether the data in the next block column of the disk block of the storage management table 106 designated by the variable $B_1$ is "8000" or not is determined to determine whether the disk block is the last one or not (step S131). If it is the last one, it means that the encoded data previously transferred to the image memory buffer 103 is the last one and "8000" is written at the position of the image memory buffer management table 105 designated by the variable $x_2$ (step S137).

On the other hand, if the decision is made that there still is data to be transferred from the storage to the image memory buffer 103, the memory block to be next transferred is searched (step S132). The searched memory block number is written at the variable $y_2$. In steps S135 and S136, the variable $x_2$ is updated by the variable $y_2$, and the variable $A_1$ is updated by the variable $B_1$. Then, the process returns to the step S128.

A process to print out the data stored in the image memory buffer 103 is now explained with reference to a flow chart of FIG. 20. This process is carried out in parallel to the process of FIG. 19 and it is carried out when it is determined that the data to be transferred to the record decoder 110 is in the image memory buffer 103.

The image memory buffer management table 105 is referred to search the memory block number in which the top portion of the stored encoded data is stored, and it is written at a variable $x_3$. Then, whether the data is for recording (printing) or not is determined (step S139). If it is for recording, the data of the memory block designated by the variable $x_3$ is transferred to the record decoder 110 to record the data (step S140). The next block number of the image memory buffer management table 105 designated by the variable $x_3$ is stored at a variable $y_3$ (step S142), and "FFFF" is written into the position in which the next block number has been stored to release it for storing in other process (step S143). Then, whether the variable $y_3$ is "8000", that is, whether the block is the last one or not is determined. If it is other than "8000", it means that data continuously exists, and the data of the variable $x_3$ is updated by the variable $y_3$. Then, the process returns to the step S139.

<Memory Transmission>

In the above example, the compressed encoded data stored in the storage 102 is transferred to the image memory buffer 103 and printed out by the recorder 109 through the record encoder 110. The process in the memory transmission mode is substantially same.

In the memory print mode, the internal encoded data is supplied to the record encoder 110. In the memory transmission mode, the output destination is changed to the communication codec. The line connection process should be carried out prior to this process.

In the memory transmission mode, the data to be transmitted from the storage 102 to the image memory buffer 103 is read out. This process is carried out by a flow chart of FIG. 19 and the detailed explanation thereof is omitted.

Figure 20:
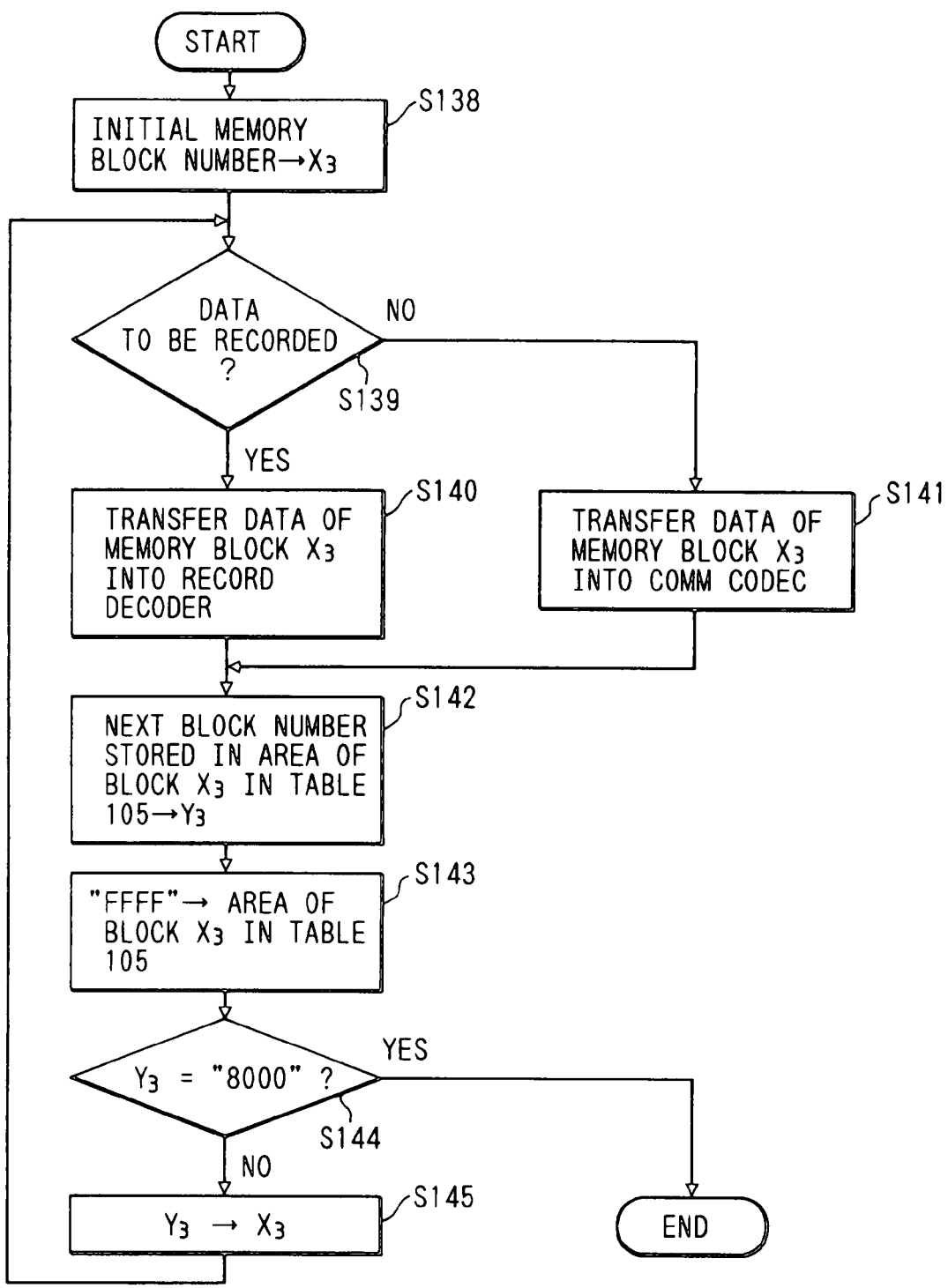
FIG. 20 shows a flow chart of an image record or transmission process of the data stored in the memory.

In order to supply the data to the communication codec 111, only a step S139 of a flow chart of FIG. 20 to determine whether the data to be supplied is for printing or not and a step S141 to select the communication codec 111 as an output destination if the decision in the step S139 is NO need be added. Accordingly, the memory transmission mode is duplicate of the memory print mode described above and the detailed explanation thereof is omitted.

The transfer paths for the internal encoded data between the image memory buffer 3 and the read encoder 108, and between image memory buffer 3 and the record decoder 110 are fixed.

The transfer path between the image memory buffer 103 and the read encoder 108 is exclusively used by the memory storing operation, and the transfer path between the image memory buffer 103 and the record decoder 110 is exclusively used by the memory print operation.

In the present embodiment, the transfer path between the communication codec 111 and the image memory buffer 103 for one line is also fixed after the transmission/reception has been established. In the transmission mode, the memory transmission operation exclusively uses it, and in the reception mode, the memory reception operation exclusively uses it.

The transfer path between the image memory buffer 103 and the storage 102 is shared by the memory storing operation, the memory reception operation, the memory print operation and the memory transmission operation.

The FAX controller arbitrates a right to use the transfer paths at each end of the transfer of one memory block. The arbitration enables the following 11 combinations.

(1) memory storing-memory print-memory transmission
(2) memory storing-memory print-memory reception
(3) memory storing-memory print
(4) memory storing-memory transmission
(5) memory storing-memory reception
(6) memory storing-memory transmission
(7) memory storing-memory reception
(8) memory storing
(9) memory print
(10) memory transmission
(11) memory reception Since the respective operations can independently process separate images, dual access is attained so that in the course of transmission the next document may be read without waiting for the end of transmission.

In the present embodiment, the internal compressed encoded data is transferred memory block by memory block. Where a plurality of memory blocks are to be transferred at one time or a plurality of continuous memory blocks are available, a plurality of blocks may be transferred, and where a plurality of continuous memory blocks are not available, one memory block is transferred at one time. In this manner, one-unit transfer and multi-unit transfer may be selectively used.

In the present embodiment, a transmission/reception facsimile system is used, although the present invention is also applicable to a facsimile system which only receives or transmits. The present invention is also applicable to an input/output unit of an image electric file.

In accordance with the second embodiment, the encoding of the read image, the conversion of the image information for recording and the data conversion through the line are performed by the independent converters, and the data transfer to the respective converters in the system is carried out by the common encoded data in the system for each block of the predetermined size. Accordingly, the combined operation of a plurality of processes such as reading, recording and communication can be attained.

A third embodiment in which the record output is altered in accordance with a remaining storage capacity of the hard disk is now explained.

Figure 21:
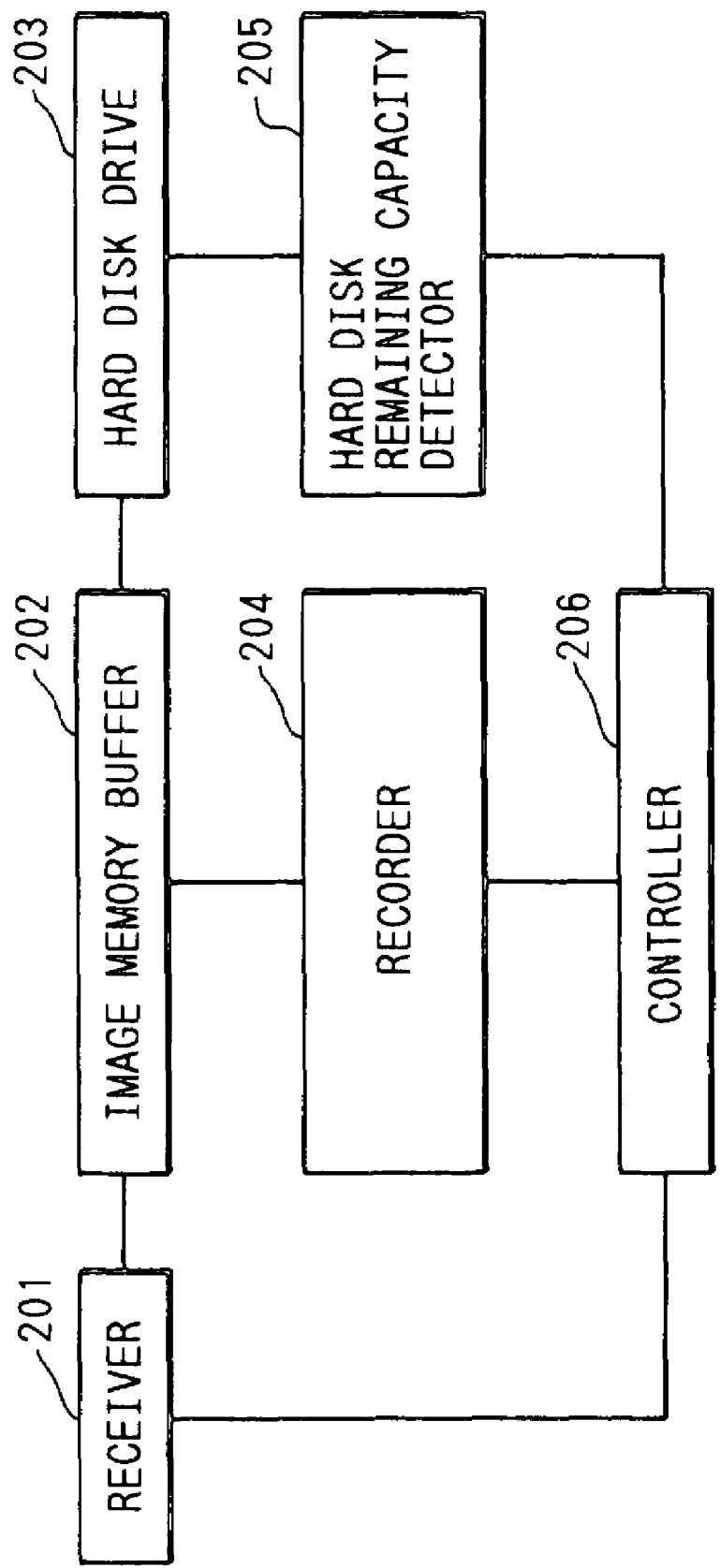
FIG. 21 shows a block diagram of a facsimile system in accordance with a third embodiment.

FIG. 21 shows a block diagram of a facsimile system in accordance with the third embodiment. In FIG. 21, a configuration of a transmission unit is omitted. The facsimile system of the third embodiment is similar in configuration to that of FIG. 1 or FIG. 14 except that a remaining capacity detector for the hard disk is provided.

The facsimile system comprises a receiving unit 201 for receiving image information from a transmitting facsimile system, an image memory buffer 202 for temporarily storing the received image, a hard disk drive 203 for storing the received information by a communication unit as a rule, a recorder 204 for recording the image information on a record sheet, a hard disk remaining capacity detector 205 for detecting a remaining vacant area capacity of the hard disk drive 203, and a controller 206 for controlling the overall system.

In the above configuration, the image memory buffer 202 functions as an image memory in a conventional facsimile system and the hard disk drive 203 functions as a secondary storage which is inherent to the present embodiment.

Figure 22:
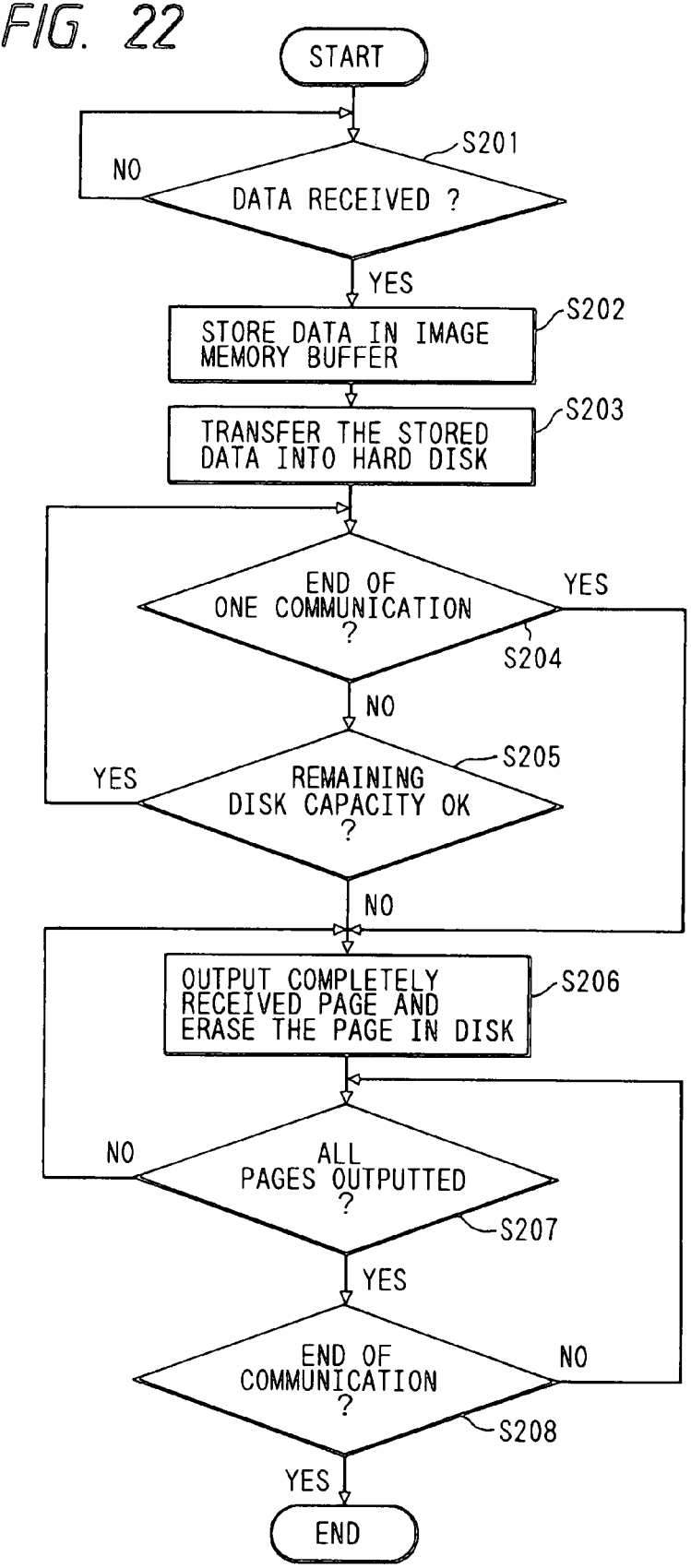
FIG. 22 shows a flow chart of a receiving process in the third embodiment.

FIG. 22 shows a flow chart of a receiving operation in the facsimile system configured as described above.

When the receiving unit 201 receives the image (S201), it is stored into the image memory buffer 202 (S202). The image stored in the image memory buffer 202 is stored into the hard disk drive 203 by a synchronization mechanism (S203).

When the controller 206 confirms that the reception by the receiving unit 201 is over and one communication unit of image (one file) has been stored in the hard disk drive 203 (S204, S205), it supplies the image to the recorder 204 through the image memory buffer 202 (S206). When the full page has been outputted (S207), the process is terminated.

During the reception by the receiving unit 201, the controller 206 detect the remaining capacity of the hard disk drive 203 by the hard disk remaining capacity detector 205, and when it reaches below a predetermined level (S205), it supplies only those pages which have been stored in the hard disk drive 203, to the recorder 204 through the image memory buffer 202 (S206).

After the data has been supplied to the recorder 204, the pages in the hard disk drive 203 which have been recorded are erased from the hard disk drive 203. Thereafter, the receiving unit 201 occupies the recorder 204, and each time the received page is established on the hard disk drive 203, it is supplied to the recorder 204 through the image memory buffer 202 (S207 and S208).

In the present embodiment, the hard disk is used as the secondary storage although a semiconductor memory may be used instead.

In the present embodiment, when the remaining capacity of the hard disk is insufficient, the receiving unit 201 occupies the recorder 204 to output the data page by page. Alternatively, when the remaining capacity becomes short, the hard disk may be cleared and the image after the mid-point is stored in the hard disk and it may be outputted to the recorder 204 after the completion of one unit of communication (one file).

The present invention is not limited to the embodiments described above but various modifications may be made.

The invention claimed is:

1. A data processing system, comprising:
a memory for temporarily storing data;
a storage for storing data by performing a relative movement between a record medium and a transducer;
control means for storing data into said memory by a predetermined unit of data at a time and storing the data stored in said memory into said storage by the predetermined unit of data at a time, the storing of the data into said memory and the storing of the data from said memory into said storage being carried out in parallel operations; and
a first management table memory including information used for storing the data into said memory, wherein said control means stores the data into said memory in accordance with the information included in said first management table memory.

2. A data processing system according to claim 1 further comprising a second management table memory for storing information controlling a data storing operation of the data from said memory to said storage, wherein said control means stores the data into said storage in accordance with the information included in said second management table memory.

3. A data processing system comprising:
a memory having a group of memory blocks of a predetermined size for temporary storing data, said memory being used in common for a plurality of processes at one time;
a storage for storing data;
detection means for detecting an unoccupied memory block of said memory at any position in said memory; and
control means for controlling the storing of the data in said memory and the storing of the data from said memory to said storage,
wherein said control means stores the data into unoccupied memory blocks of said memory detected by said detection means, stores the data in occupied memory blocks into said storage, and renders the memory blocks of said memory whose data has been stored into said storage and unoccupied memory blocks to permit the storing of data into the unoccupied memory blocks, and
wherein the storing of the data into said memory and the storing of the data from said memory into said storage are carried out in parallel operations,
further comprising a first management table memory including information used for storing the data into said memory, wherein said control means stores the data into said memory in accordance with the information included in said first management table memory.

4. A data processing system according to claim 3 further comprising a second management table memory including information used for storing the data from said memory to said storage, wherein said control means stores the data into said storage in accordance with the information included in said second management table memory.

5. A data processing system having a storage for storing data, comprising:
- a memory having a group of memory blocks of a predetermined size, said memory being used in common for a plurality of processes at one time;
- storage means for storing data into the memory blocks of said memory at any position in said memory;
- detection means for detecting an occupied memory block during the storing of the data into said memory blocks by said storage means;
- memory means for storing the data from one memory block when said detection means detects that the one memory block is an occupied memory block;
- release means for releasing the one memory block whose data has been stored into said memory means to said storage means as an unoccupied memory block; and
- a first management table memory including information used for storing the data into said memory,
- wherein said storage means stores the data into said memory in accordance with the information included in said first management table memory,
- wherein the storing of the data into said memory and the storing of the data from said memory into said storage are carried out in parallel operations.

6. A data processing system according to claim 5 further comprising a second management table memory including information used for storing the data from said memory to said storage, wherein said control means stores the data into said storage in accordance with the information included in said second management table memory.

7. A data processing method, comprising:
- a temporary storing step, for temporarily storing data into a memory;
- a second storing step, for storing data into a storage by performing a relative movement between a record medium and a transducer; and
- a third storing step, for storing data into the memory by a predetermined unit of data at a time and storing the data stored in the memory into the storage by the predetermined unit of data at a time, the storing of the data into the memory and the storing of the data from the memory into the storage being carried out in parallel operations,
- wherein said third storing step is performed in accordance with information included in a first management table memory.

8. A data processing method according to claim 7, wherein, in said third storing step, the data is stored into the storage in accordance with information included in a second management table memory.

9. A method for storing data comprising the steps of:
- detecting an unoccupied block of a memory having a group of memory blocks of a predetermined size, wherein the memory stores data in the unoccupied memory blocks at any position in the memory and the memory is used in common for a plurality of processes at one time;
- storing data from an occupied memory block of the memory into a storage; and
- rendering the memory block whose data has been stored in said storage as an unoccupied memory block to permit the storing of data into the unoccupied memory block, wherein the storing of the data into said memory and the storing of the data from said memory into said storage are carried out in parallel operations, and
- wherein the storing of the data into the memory is performed in accordance with information included in a first management table memory.

10. A data processing method according to claim 9, wherein the storing of the data into said storage in accordance with information included in a second management table memory.

11. A data processing system, comprising
- a memory for temporarily storing data;
- a storage for storing data;
- controller for storing data into said memory by a predetermined unit of data at a time and storing the data stored in said memory into said storage by the predetermined unit of data at a time, the storing of the data into said memory and the storing of the data from said memory into said storage being carried out in parallel operations; and
- a bus commonly used to store data in said memory and store the data stored in said memory into said storage,
- wherein said controller executes a first process program for storing data in said memory and a second program for storing the data stored in said memory into said storage concurrently.

12. A system according to claim 11, wherein said controller, said memory and said storage are connected directly to said bus.

13. A data processing method, comprising the steps of:
- temporarily storing data in a memory;
- storing data in a storage by performing a relative movement between a record medium and a transducer;
- storing data into the memory by a predetermined unit of data at a time and storing the data stored in the memory into the storage by the predetermined unit of data at a time, the storing of the data into the memory and the storing of the data from the memory into said storage being carried out in parallel operations; and
- providing a first management table memory including information used for storing the data into the memory, wherein said storing step stores the data into the memory in accordance with the information included in said first management table memory.

14. A data processing method according to claim 13 further comprising a step of providing a second management table memory for storing information controlling a data storing operation of the data from the memory to the storage, wherein said storing step stores the data into the storage in accordance with the information included in the second management table memory.

15. A data processing method comprising the steps of:
- providing a memory having a group of memory blocks of a predetermined size for temporary storing data, the memory being used in common for a plurality of processes at one time;
- providing a storage for storing data;
- detecting an unoccupied memory block of the memory at any position in the memory; and
- control means for controlling the storing of the data in the memory and the storing of the data from the memory to the storage,
- wherein the control step stores the data into unoccupied memory blocks of the memory detected by said detection step, stores the data in occupied memory blocks into the storage, and renders the memory blocks of the memory whose data has been stored into the storage and unoccupied memory blocks to permit the storing of data into the unoccupied memory blocks, and wherein the storing of the data into the memory and the storing of the data from the memory into the storage are carried out in parallel operations, further comprising a step of providing a first management table memory including information used for storing the data into the memory, wherein said control step stores the data into the memory in accordance with the information included in the first management table memory.

16. A data processing method according to claim 15 further comprising a step of providing a second management table memory including information used for storing the data from the memory to the storage, wherein the control step stores the data into the storage in accordance with the information included in the second management table memory.

17. A data processing method having a storage for storing data, comprising the steps of:
   providing a memory having a group of memory blocks of a predetermined size, the memory being used in common for a plurality of processes at one time;
   providing storage means for storing data into the memory blocks of the memory at any position in the memory;
   detecting an occupied memory block during the storing of the data into the memory blocks by the storage means;
   providing memory means for storing the data from one memory block when said detection step detects that the one memory block is an occupied memory block;
   releasing the one memory block whose data has been stored into the memory means to the storage means as an unoccupied memory block; and
   providing a first management table memory including information used for storing the data into the memory,
   wherein the storage means stores the data into the memory in accordance with the information included in the first management table memory,
   wherein the storing of the data into the memory and the storing of the data from the memory into the storage are carried out in parallel operations.

18. A data processing system according to claim 17 further comprising a second management table memory including information used for storing the data from said memory to said storage, wherein said control means stores the data into said storage in accordance with the information included in said second management table memory.

19. A data processing method, comprising the steps of:
   providing a memory for temporarily storing data;
   providing a storage for storing data;
   storing data into the memory by a predetermined unit of data at a time and storing the data stored in the memory into the storage by the predetermined unit of data at a time, the storing of the data into the memory and the storing of the data from the memory into said storage being carried out in parallel operations; and
   commonly using a bus to store data in the memory and store the data stored in the memory into the storage,
   wherein said storing step executes a first process program for storing data in the memory and a second program for storing the data stored in the memory into the storage concurrently.

* * * * *